United States Patent [19]

Numamoto et al.

[11] 4,383,376
[45] May 17, 1983

[54] CONTACT-DEHYDRATING SHEET FOR DRYING PROTEIN-CONTAINING FOOD

[75] Inventors: Yukio Numamoto, Kunitachi; Juichi Kasai, Tokyo, both of Japan

[73] Assignees: Showa Denko Kabushiki Kaisha, Tokyo, Japan

[21] Appl. No.: 235,688

[22] Filed: Mar. 18, 1981

[51] Int. Cl.³ .......................... F26B 5/16; F26B 19/00
[52] U.S. Cl. .............................................. 34/9; 34/95; 426/443; 428/474.7
[58] Field of Search ...................... 34/9, 95; 206/20.4; 426/124, 129, 112, 132, 443, 398; 428/474.7

[56] References Cited

U.S. PATENT DOCUMENTS 3,661,815  5/1972  Smith .................................. 260/17.4
4,124,116  11/1978  McCabe, Jr. ............................ 34/95

FOREIGN PATENT DOCUMENTS 54-1191  6/1979  Japan.
54-1192  6/1979  Japan.

*Primary Examiner*—Larry I. Schwartz
*Attorney, Agent, or Firm*—Armstrong, Nikaido, Marmelstein & Kubovcik

[57] ABSTRACT

A contact-dehydrating sheet suitable for use in the production of dried protein-containing food such as fish and meat and a method for drying the protein-containing food are presented. The contact-dehydrating sheet comprises:

(a) a water permeable film,
(b) a dehydrating layer consisting essentially of a water absorbing polymer substance dispersed in a hydrophilic adhesive substance, said layer being placed on the surface, opposite to the surface where the protein-containing food to be dried is contacted, of the water-permeable film, and
(c) a protective film covering over the dehydrating layer.

10 Claims, 2 Drawing Figures

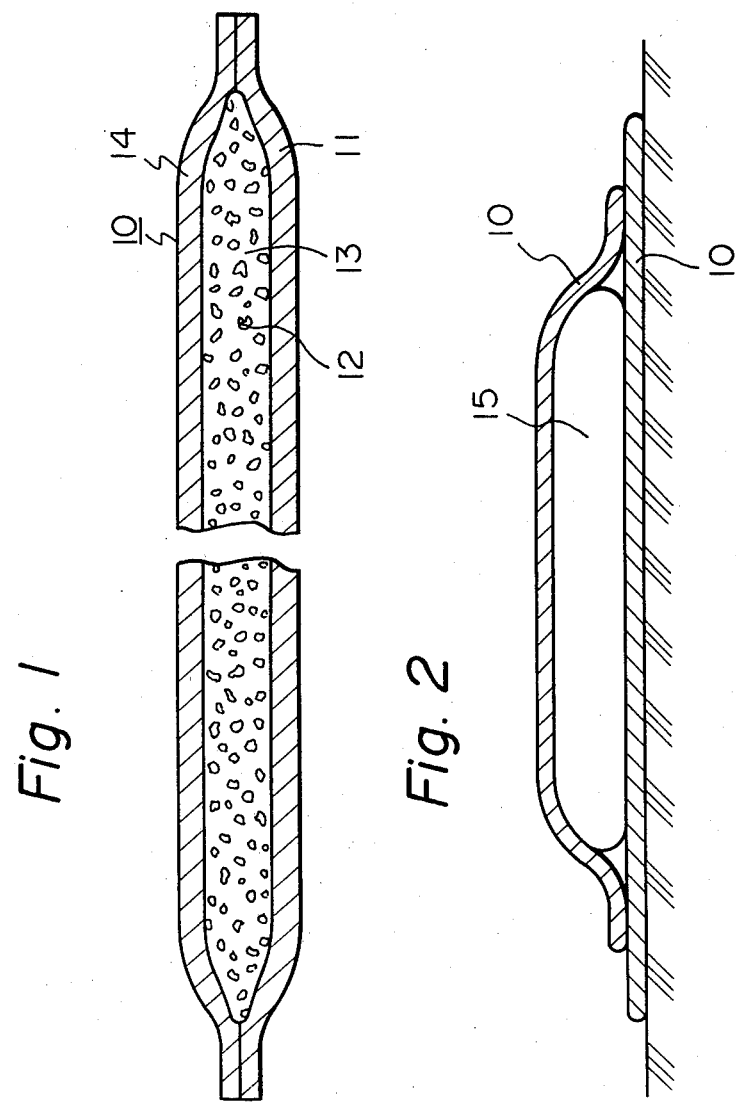

CONTACT-DEHYDRATING SHEET FOR DRYING PROTEIN-CONTAINING FOOD

BACKGROUND OF THE INVENTION (1) Field of the Invention

The present invention relates to a contact-dehydrating sheet suitable for use in the preparation of dried or cured protein-containing food such as, for example, marine products (e.g. fishes) and meat for human consumption (e.g. beef, pork, lamb, chicken, game and the like). The present invention also relates to a method for preparing dried protein-containing food.

(2) Description of the Prior Art

It has been done worldwide from ancient times that protein-containing food such as fish and meat was dried by using sunlight to extend the preservative period of the protein-containing food. Recently, such drying has also been carried out by using fuel, such as heavy oil, instead of natural sunlight. That is to say, the air atmosphere temperature is raised directly or indirectly by the combustion heat energy of the fuels, whereby the relative humidity of the air atmosphere is decreased. In the air atmosphere having a decreased relative humidity and an elevated temperature, protein-containing food is hung up or placed on suitable racks generally composed of wire mesh or wire netting. in that:

(1) The drying step is largely affected by weather conditions which cannot be artificially controlled.

(2) The protein-containing food to be dried is unhygienically impaired or contaminated during the drying step by insects such as flies;

(3) The troublesome operations requiring much labor are included in hunging up the protein-containing food to be dried;

(4) In the case where the drying power is not sufficient to dry the protein-containing food at a desired drying rate (this frequently occurs due to cloudy weather and high humidity), the protein-containing food becomes half or nearly totally decomposed or stale conditions due to the fact that, since the drying rate (or water removal rate) of the protein-containing food is delayed, the active water content region, in which the activity of various bacteria is weakened, cannot be readily established in the body of the protein-containing food. Contrary to this, in the case where the drying rate is too high, a so-called "surface drying phenomenon" (which means only the surface portion of the substance to be dried is preferentially dehydrated to form the dried dense surface through which the transfer of water present in the body becomes difficult) occurs and, therefore, dried products having desired properties cannot be obtained. In order to obviate these problems, protein-containing food is generally dipped in an aqueous salt solution once or several times prior to the drying. However, this salt treatment produces very salty dried products, which are not desirable from the point of view of not only taste but also the generation of disease such as hyperpiesia.

Contrary to the case where the protein-containing food is dried by using sunlight, the above-mentioned problems can be solved by adopting a drying system in which artificially heated air or dried air is used in a so-called dryer for drying protein-containing food. However, this method still has disadvantages that:

(1) Fuel cost is very high, especially due to the recent increase in oil prices.

(2) Qualities of dried products become worse due to the fact that the hardening and oxidation of the protein are accelerated and autodigestion of the protein proceeds because of the increase in temperature.

(3) Amounts of available fresh food such as fish are not constant and, therefore, does not match the capacity of an enclosed drying system.

Furthermore, in either case, in the case where the protein-containing food is hung during drying, since the dried products shrink and the size of the protein-containing food becomes small, the commercial value of the products is decreased.

In addition to the above-mentioned drying methods, there is a drying method in which solid desiccant such as diatomaceous earth is used, although this method is not conventional. In this method protein-containing food is buried and dried in diatomaceous earth. However, since the dehydrating power or capacity of diatomaceous earth is relatively small in terms of the weight basis, an extremely large amount of diatomaceous earth, as compared with the weight of protein-containing food, must be used, which causes a lot of troublesome work and high cost. In addition, when the diatomaceous earth is used, only the surface portion of the protein-containing food is preferentially dried, a so-called surface drying phenomenon occurs. These problems also occur in the case where other solid desiccants similar to diatomaceous earth are used.

Furthermore, although a freeze-drying (or lypophilization) method can be theoretically applied to dry food, this is not practical for use in drying protein-containing food because the specific surface area of protein-containing food is small and, also, the decrease in the qualities of the products tends to occur because the flesh becomes spongy.

As a special method for preserving fresh protein-containing food, salt pickling and syrup pickling method may be applied. However, these methods have problems in that salt and syrup are transferred into the body of the protein-containing food to be dried, whereby the taste of the protein-containing food is remarkably changed and, also, that the dehydrating power of the salt and syrup solutions rapidly decreases as the dehydration from the protein-containing food proceeds, so that constant dehydrating power cannot be kept during the drying step.

SUMMARY OF THE INVENTION

Accordingly, an object of the present invention is to obviate the above-mentioned disadvantages and problems of the prior art and to provide a contact-dehydrating sheet suitable for use in the production of dried protein-containing food without the accompanying the above-mentioned disadvantages and problems.

Another object of the present invention is to provide a method for effectively and economically drying protein-containing food, without being affected by weather.

Other objects and advantages of the present invention will be apparent from the following description.

In accordance with the present invention, there is provided a contact-dehydrating sheet for drying protein-containing food compresing:

(a) a water-permeable film, (b) a dehydrating layer consisting essentially of a water absorbing polymer substance dispersed in a hydrophilic adhesive substance, said layer being placed on the surface, opposite to the surface where the protein-containing food to be dried is contacted, of the water-permeable film; and (c) a protective film covering over the dehydrating layer.

In accordance with the present invention, there is also provided a method for drying protein-containing food comprising the step of contacting at least a portion of the protein-containing food to be dried with a contact-dehydrating sheet, said sheet comprising: (a) a water-permeable film, (b) a dehydrating layer consisting essentially of a water absorbing polymer substance dispersed in a hydrophilic adhesive substance, said layer being placed on the surface, opposite to the surface where the protein-containing food to be dried is contacted, of the water-permeable film; and (c) a protective film covering over the dehydrating layer.

BRIEF DESCRIPTION OF THE DRAWING

The present invention will be better understood from the description set forth below with reference to the accompanying drawings wherein:

FIG. 1 is a cross-sectional view schematically illustrating the structure of the preferred embodiment of the contact-dehydrating sheet of the present invention; and FIG. 2 is a cross-sectional view schematically illustrating the condition in which protein-containing food is dried by using the contact-dehydrating sheets of the present invention.

DETAILED DESCRIPTION OF THE INVENTION

As illustrated in FIG. 1, the contact-dehydrating sheet 10 of the present invention contains a water absorbing polymer substance 12 in the form of regularly or irregularly shaped particles or flakes, which are dispersed in a hydrophilic adhesive substance 12. This dehydrating layer composed essentially of the water absorbing polymer substance 12, dispersed in the hydrophilic adhesive substance 13 is enclosed with two films 11 and 14, at least one of which should be a water permeable film. The surface of the water permeable film, opposite to the surface where the dehydrating layer is contacted, is contacted with the surface of protein-containing food 15 to be dried as illustrated in FIG. 2. The other film of the films 11 and 14 may be a protective film covering over the dehydrating layer, which can be any kind of water permeable or non-permeable film.

The water absorbing polymer substances used in the present invention, which absorb the water contained in the protein-containing food therefrom, are so-called hydrophilic polymer compounds which are not water-soluble and, also, which absorb a large amount of water and swell when they are contacted with water, whereby the polymer compounds form stable gel. Examples of the above-mentioned water-insoluble hydrophilic polymer compounds are (i) tridimensional crosslinked products of such hydrophilic polymers or copolymers as those of acrylic acid, methacrylic acid, acrylates, methacrylates, acrylic esters, methacrylic esters, acrylic amide or methacrylic amide, ethylene oxide, propylene oxide, vinyl alcohol, carboxymethylcellulose, (ii) graft copolymers of the above acryl or methacryl compounds with polysaccharides (e.g. starch, cellulose and the like) or (iii) the saponified products thereof. Examples of the crosslinking agents which can be used in the preparation of the above tridimensional crosslinked products are: di-or tri-(meth)acrylic esters of polyols such as ethylene glycol, trimethylolpropane, glycerine, polyoxyethylene glycol, polyoxypropylene glycol and the like; unsaturated polyesters obtained from the reaction of the above-mentioned polyols with unsaturated acids such as maleic acid; bis(acrylic amide) such as N,N-methylene-bis(acryl amide); di-or tri-(meth)acrylic esters obtained from the reaction of polyepoxide and (meth)acrylic acid; di(-meth)acrylic carbamyl esters obtained from the reaction of polyisocyanates such as tolylene diisocyanate, hexamethylene diisocyanate and the like with hydroxyethyl (meth)acrylate; allylated starch and allylated cellulose. In addition to the above-mentioned crosslinking agents, bifunctional compounds, such as, methylol (meth)acrylic amide, glyoxal, phthalic acid, adipic acid, ethylene glycol and the like, which are crosslinkable under certain conditions; or polymethalic salts such as calcium oxide, zinc diacetate and the like may optionally be used as a crosslinking agent.

The hydrophilic adhesive substances used in the present invention prevent non-homogeneous or irregular distribution of the water absorbing polymer substances in the dehydrating layer and enlarge the effective surface area of the water absorbing polymer substances by allowing the transfer of water from the entire surface of the water permeable film to the water absorbing polymer substances. Examples of hydrophilic adhesive substances are hydrophilic polysaccharides and the chemically modified products thereof, such as, natural adhesive or glue substances such as cyamoposis gum, locust bean gum, carrageenan, alginic acid, agar-agar, arabinose, gum arabic, tragacants gum; pectine, starch, konjak mannan, gelatine, casein, albumin, shellac, and the like; semisynthetic adhesive or glue substances such as oxidation, methylation, ethylation, carboxymethylation, hydroxyethylation, hydroxypropylation, phosphorization and cationization derivatives of starch, cyamoposis gum, locust bean gum and cellulose, and ammonium alginate, propylene glycol ester of alginic acid and the like. Synthetic hydrophilic adhesive or glue substances such as poly(vinyl alcohol), poly(sodium acrylate) and the like can also be used. These substances can be used in the form of a concentrated aqueous solution thereof or hydrated products thereof.

The water permeable films used in the present invention are those which have desirable water-resistant strength and which are water permeable. In addition, the water permeable films are preferably such that no substantial amount of the hydrophilic adhesive substance can penetrate through the films, when the contact-dehydrating sheet of the present invention is contacted with protein-containing food to be dried. Examples of the water permeable films are plain cellophane (not moistureproof finished), glassine paper, parchment paper, non-woven fabric films (including synthetic paper) and the like.

The protective films can be any films which have a desirable water-resistant strength and through which no substantial amount of the above-mentioned hydrophilic substance can penetrate. Examples of the protective films are, in addition to above-exemplified water permeable films, synthetic resin films such as polyethylene film, polypropylene film, poly(vinyl chloride) film, poly (vinylidene chloride) film, poly(vinyl acetate) film, polyester film, and polyamide film, metal foil such as aluminum foil, paraffin paper, and any combined films thereof.

The contact-dehydrating sheet of the present invention can be prepared in any conventionally known manner. For instance, the dehydrating layer can be manually or automatically coated on either the water permeable film or the protective film by means of roll-coating, spraying, hand coating and the like and, then, either the protective film or the water permeable film is placed over the coated dehydrating layer. The periphery portions of the assembled films can be sealed by, for example, heat sealing, pressure sealing, and adhesive sealing. The dehydrating layer can be composed of the water absorbing polymer substance particles or flakes, which can be dispersed in the hydrophilic adhesive substance prior to the coating of the dehydrating layer, or which can be spread over the previously coated hydrophilic adhesive substance layer on the film.

Although there is no specific limitation in the size of the contact-dehydrating sheet of the present invention, it is practically convenient that the width of the contact-dehydrating sheet can be between 10 and 100 cm and the thickness of the contact-dehydrating sheet can be between 1 and 10 mm.

According to another embodiment of the present invention, a spacer comprising, for example, various nettings, perforated plates or embossed sheets can be advantageously spaced in the dehydrating layer to prevent the movement of the water absorbing polymer substance particles or flakes in dispersion during storage, handling or use of the contact-dehydrating sheet.

As illustrated in FIG. 2, according to the method of the present invention, protein-containing food 15 to be dried is placed on the contact-dehydrating sheet 10 is such a manner that the surface of the proten-containing food 15 is contacted with the water permeable film of the contact-dehydrating sheet 10. Thereafter, another contact-dehydrating sheet 10 is placed over the protein-containing food 15 in the same manner as mentioned above, although the use of another sheet 10 is not essential in the present invention.

According to the present invention, water contained in the protein-containing food is transferred and penetrates through the water permeable film and, then, water is transferred through the hydrophilic adhesive substance and, finally, is absorbed into the water absorbing polymer substance particles or flakes. Thus, the protein-containing food is effectively dehydrated by the contact-dehydrating sheet of the present invention, without directly contacting the water absorbing polymer substance, at an ambient temperature and humidity. The driving force of the dehydration in the present invention is the difference in the water content at the boundary film of the water absorbing polymer substance and the hydrophilic adhesive substance. In addition, since the hydrophilic adhesive substance is water permeable or has a water absorbing capacity as mentioned above, the movement of the water from the water permeable film can be smoothly effected due to the high tonicity thereof in the case where the hydrophilic adhesive substance contains a relatively small amount of water. It should be noted that since the water absorbing polymer substances used in the present invention generally have an extremely high water absorbing capacity, as compared to the absorbing capacity of the hydrophilic adhesive substances used in the present invention, the water absorbing power of the water absorbing polymer substances can be desirably maintained for a long time.

The used contact-dehydrating sheet of the present invention containing a lot of absorbed water can be readily regenerated by, for example, exposure to sunlight.

As described hereinbefore, according to the present invention, the above-mentioned disadvantages and problems can be effectively solved. That is to say:

(1) Dried or semi-dried protein-containing food can be preserved even on cloudy or rainy days.

(2) There is no substantial unhygienic contamination due to insects (e.g. flies) or dust, since the drying process can be carried out in the enclosed system.

(3) Since the dehydration rate of the protein-containing food is high, the active water content region in which the activity of various bacteria is weakened can be rapidly established in the body of the protein-containing food, whereby the breeding or reproduction rate of bacteria in the body of the protein-containing food can be remarkably lowered.

(4) Since the dehydration is carried out in a liquid phase, a so-called surface drying phenomenon does not occur.

(5) Since no additional salt is used during the drying step, dehydrated, dried or semi-dried protein-containing food having a low salt content can be obtained.

(6) Since the drying step can be carried out at a room temperature or even at a temperature lower than a room temperature, problems such as the hardening of the protein, the acceleration of the oxidation, the autodigestion of the protein and the like do not occur or are negligible if any.

(7) Since the protein-containing food is dried in the sandwiched state between the two contact-dehydrating sheets, the shrinkage in the projected area of the body is small although the thickness becomes thin.

(8) Since the dehydration is carried out in a liquid phase, the flesh does not become spongy as in the case of the freeze-drying method.

(9) Since the water absorbing polymer substance in the form of particles or flakes does not penetrate through the water permeable film, the contaminatin of the dried food with the water absorbing polymer substance does not occur.

EXAMPLES

The present invention is further illustrated by, but is by no means limited to, the following examples.

EXAMPLE 1

A contact-dehydrating sheet was prepared by using water absorbent polymer PX-402A in the form of particles (tridimensionally crosslinked polymer substance of sodium acrylate, available from Showa Denko Kabushiki Kaisha). The water absorbent polymer particles spread between two sheets of dry crepe paper each having a weight of 13 g/m$^2$ in such an amount that the spreading amount becomes 80 g/m$^2$. The sheets of dry crepe paper containing 80 g/m$^2$ of the water absorbent polymer particles are pressed between a pair of embossing rollers, so that the water absorbent polymer particles do not freely move.

On ordinary or conventionally used plain cellophane having a weight of 30 g/m$^2$, syrup or jelly derived from starch having a water content of 20% and a D.E. value of 50 is coated at a converage of 500 g/m$^2$ and, thereover, the embossed set of sheets containing the water absorbent polymer particles therebetween was placed and, then, the cellophane film was placed thereover to form a contact-dehydrating sheet. The peripheral portions of the sheet are sealed by using a pressure-sensitive adhesive tape.

102 g of meat derived from 300 g of fresh sagittated calamary (cuttlefish) in the state of being wrapped with cellophane was put between the folded contact-dehydrating sheet obtained above. The meat was allowed to stand for one day at room temperature (i.e. about 23° C.), the weight thereof decreased to about 68 g (about 67% of the starting weight). No substantial shrinkage in the projected area of the starting meat body was observed, although the thickness thereof becomes thin.

The taste of the semi-dried product thus obtained after lightly roasting was tested by a panel composed of 5 members. As a result, all members recognized that the taste was good and the concentration of tasty components was felt. When the semi-dried product was roasted, a large amount of water was not exuded as shown in the case where raw cuttlefish meat was roasted and, therefore, it was noted that the snack processing ability of the semi-dried product of the present invention was good.

The meat of the semi-dried product obtained above was soft, as compared with conventionally dried cuttlefish having a water content of from 15 to 20%. Accordingly, the meat of the semi-dried product obtained from the present drying method can be readily chewed even by persons having bad teeth. In addition, different from conventionally dried cuttlefish which must be softened before cooking by being soaked in water, the semi-dried product obtained above can be directly cooked by removing the cellophane wrapper therefrom.

EXAMPLE 2

The contact-dehydrating sheet was prepared in a manner as described in Example 1, except that the water absorbent polymer particles used in Example 1 were directly spread over the surface of the syrup coated on the celluophane by using a seasoning dispenser.

120 g of meat of raw sagittated calamary was dried for one night at room temperature in a manner as described in Example 1. As a result, 78 g of the semi-dried product having properties similar to those of Example 1 was obtained (yield 65%).

EXAMPLE 3

The contact-dehydrating sheet was prepared in a manner as described in Example 2, except that natural paste, cyamoposis gum was coated at a coverage of 120 g/m$^2$ on the cellphane instead of the syrup.

105 g of meat of raw sagittated calamary was dried for one day at room temperature to obtain 65 g of the dried product (yield 62%).

EXAMPLE 4

A contact-dehydrating sheet was prepared in a manner as disclosed in Example 1, except that parchment paper was used as a water permeable and protective film, instead of cellophane.

90 g of meat of raw sagittated calamary, which was wrapped in cellophane, was dried by using the contact-dehydrating sheet for one day at room temperature. 61 g of the dried product was obtained (yield 68%).

Since the parchment paper was stiff as compared with the cellophane, the processing of the contact-dehydrating sheet was facilitated by using the parchment paper. However, although the aqueous syrup did not exude from the parchment paper during the dehydration for one day, a slight amount of the aqueous syrup exudes from relatively large sized pinholes of the parchment paper if the raw protein-containing food is sandwiched between the above-mentioned contact-dehydrating sheets for a long time.

EXAMPLE 5

The contact-dehydrating sheet was prepared in a manner as described in Example 3, except that super-calendered glassine paper having a weight of 35 g/m$^2$ was used as a water-permeable and protective film.

108 g of meat of raw sagittated calamary was dried for one day at room temperature in a manner as described in Example 3 to obtain 70 g of the semi-dried product.

EXAMPLE 6

The contact-dehydrating sheet was prepared in a manner as described in Example 2, except that Aquakeep 4S (tridimensional crosslinked polymer of sodium acrylate, available from Seitetsu Kagagu Kogyo Kabushiki Kaisha) was used as a water absorbing polymer substance and that minute particles of Aquakeep 4S were spread on the syrup at a coverage of 100 g/m$^2$.

130 g of meat of raw sagittated calamary was dried by using the contact-dehydrating sheet prepared above for one day at room temperature in a manner as described in Example 2. 90 g of the semi-dried product was obtained.

EXAMPLE 7

A contact-dehydrating sheet was prepared by using, (i) as a water absorbing polymer substance, Sanwet IM-300 (polymer obtained from the graft polymerization of sodium acrylate to starch, available from Sanyo Kasei Kogyo Kabushiki Kaisha), (ii) as a hydrophilic adhesive substance, locust bean gum and (iii) as a water permeable and protective film, parchment paper having a weight of 42 g/m$^2$. The water absorbing polymer substance was spread at a coverage of 50 g/m$^2$ and the hydrophilic adhesive substance was coated at a coverage of 100 g/m$^2$ on the parchment paper.

150 g of meat of raw sagittated calamary, wrapped in cellophane, was dried for one day at room temperature by using the contact-dehydrating sheet prepared above. 98 g of the semi-dried product was obtained.

EXAMPLE 8

25 g of the meat of a white meat fish, sillago (*Sillago japonica*) was dried for one day at room temperature by using the contact-dehydrating sheet prepared in a manner as described in Example 1. Thus, 97 g of the dried product was obtained. On the other hand, 67 g of meat of "isaki" fish was dried for the same time as set forth above in the same conditions as described above, and 47 g of the dried product was obtained. It is believed that this difference in the dehydration rate is due to the shape of the fish, the flesh properties and the thickness of the flesh and the like. It should be noted that, the larger the specific surface area, the more rapid is the dehydration rate.

EXAMPLE 9

180 g of sliced beef having a thickness of about 7 mm was wrapped in plain cellophane having a weight of 30 g/m$^2$ and put between the folded contact-dehydrating sheet prepared in a manner as described in Example 1. This sliced beef was dried for one day at room temperature to yield 128 g of the semi-dried beef. This semi-dried beef was then frozen at a temperature of −30° C. and defrosted. The meat of the semi-dried beef was not so spongy as that of the non-dried beef after the freezing and the subsequent defrosting. The taste of the semi-dried beef was the same as that of the chilled beef.

We claim:

1. A contact-dehydrating sheet for drying protein-containing food comprising:
   (a) a water-permeable film;
   (b) a dehydrating layer consisting essentially of a water absorbing polymer substance dispersed in a hydrophilic adhesive substance selected from the group consisting of hydrophilic polysaccharides and the chemically modified product thereof and synthetic hydrophilic adhesive substances, said layer being placed on the surface, opposite to the surface where the protein-containing food to be dried is contacted, of the water-permeable film; and
   (c) a protective film covering over the dehydrating layer.

2. A contact-dehydrating sheet as claimed in claim 1, wherein said water-permeable film is selected from the group consisting of cellophane, glassine paper, parchment paper and non-woven fabric films.

3. A contact-dehydrating sheet as claimed in claim 1, wherein said water absorbing polymer substance is a water-insoluble hydrophilic polymer compound.

4. A contact-dehydrating sheet as claimed in claim 3, wherein said water-insoluble hydrophilic polymer compound is selected from the group consisting of tridimensional crosslinked products of hydrophilic polymers or copolymers, graft copolymers of acryl or methacryl compounds with polysaccharides and the saponified products thereof.

5. A contact-dehydrating sheet as claimed in claim 1, wherein said protective film is selected from the group consisting of cellophane, glassine paper, parchment paper, paraffin paper, non-woven fabric films, synthetic resin films, metal foil and any combined films thereof.

6. A method for drying protein-containing food comprising the step of contacting at least a portion of the protein-containing food to be dried with a contact-dehydrating sheet, said sheet comprising (a) a water-permeable film; (b) a dehydrating layer consisting essentially of a water absorbing polymer substance dispersed in a hydrophilic adhesive substance selected from the group consisting of hydrophilic polysaccharides and the chemically modified product thereof, and synthetic hydrophilic adhesive substances, said layer being placed on the surface, opposite to the surface where the protein-containing food to be dried is contacted, of the water-permeable film; and (c) a protective film covering over the dehydrating layer.

7. A contact-dehydrating sheet for drying protein-containing food comprising:
   (a) a water-permeable film;
   (b) a dehydrating layer consisting essentially of a water absorbing polymer substance dispersed in a hydrophilic adhesive substance selected from the group consisting of hydrophilic polysaccharides and the chemically modified product thereof, and synthetic hydrophilic adhesive substances, said layer being placed on the surface, opposite the surface where the protein-containing food to be dried is contacted, of the water-permeable film;
   (c) a protective film covering the dehydrated layer; and
   (d) a spacer composed of a netting, a perforated plate, or an embossed sheet for preventing the movement of the water-absorbing polymer substance.

8. A contact-dehydrating sheet as claimed in claim 7, wherein said water-permeable film is selected from the group consisting of cellophane, glassine paper, parchment paper, and non-woven fabric films.

9. A contact-dehydrating sheet as claimed in claim 7, wherein said water-absorbing polymer substance compound is selected from the group consisting of tridimensional crosslinked products of hydrophilic polymers or copolymers, graft copolymers of acrylic or methacryl compounds with polysaccharides and the saponified products thereof.

10. A contact-dehydrating sheet as claimed in claim 7, wherein said protective film is selected from the group consisting of cellophane, glassine paper, parchment paper, paraffin paper, non-woven fabric films, synthetic resin films, metal foil and any combined films thereof.

* * * * *